(12) United States Patent
Yamamoto et al.

(10) Patent No.: US 6,351,294 B1
(45) Date of Patent: Feb. 26, 2002

(54) TELEVISION SIGNAL RECEIVING TUNER CAPABLE OF RECEIVING FM BROADCASTING SIGNALS WITHOUT BEING AFFECTED BY OTHER INTERFERENCE SIGNALS

(75) Inventors: Masaki Yamamoto, Fukushima-ken; Toshiro Furuta, Miyagi-ken, both of (JP)

(73) Assignee: Alps Electric Co., Ltd. (JP)

( * ) Notice: Subject to any disclaimer, the term of this patent is extended or adjusted under 35 U.S.C. 154(b) by 0 days.

(21) Appl. No.: 09/094,252

(22) Filed: Jun. 9, 1998

(30) Foreign Application Priority Data

Jun. 17, 1997 (JP) ................................................ 9-159687

(51) Int. Cl.⁷ ................................................ H04N 5/44
(52) U.S. Cl. ...................................... 348/731; 348/729
(58) Field of Search ................................ 348/731, 729, 348/733, 725; 455/179.1, 182.3; H04N 5/44, 5/46, 5/50

(56) References Cited

FOREIGN PATENT DOCUMENTS

| JP | 6-62330 A | 3/1994 |
| JP | 10341382 A | * 12/1998 |

* cited by examiner

*Primary Examiner*—Sherrie Hsia
(74) *Attorney, Agent, or Firm*—Brinks Hofer Gilson & Lione

(57) ABSTRACT

A television signal receiving tuner enabling to receive a FM broadcasting signal easily, and adapted to be not affected by other interference signal at a time when receiving a television signal and/or a FM broadcasting signal is provided. The television signal receiving tuner includes the television signal input circuit (19) provided between the first input terminal (1) and the VHF input tuning circuit (7) for passing through a television signal, and the FM broadcasting signal input circuit (25) provided between the second input terminal (9) and the VHF input tuning circuit (7) for passing through a FM broadcasting signal, and the FM broadcasting signal input circuit (25) and the VHF input tuning circuit (7) is to be separated in high frequency wise at a time of receiving the television signal, and the television signal input circuit (19) and the VHF input tuning circuit (7) is to be separated in high frequency wise at a time of receiving the FM broadcasting signal.

6 Claims, 3 Drawing Sheets

TELEVISION SIGNAL RECEIVING TUNER CAPABLE OF RECEIVING FM BROADCASTING SIGNALS WITHOUT BEING AFFECTED BY OTHER INTERFERENCE SIGNALS

BACKGROUND OF THE INVENTION

1. Field of the Invention

The present invention relates to a television signal receiving tuner, and more particularly to an input circuit unit for a television signal receiving tuner in the U.S. specification, which is utilized for use on a vehicle and/or for used in a personal computer, and which is also adapted to receive Frequency Modulation (FM) broadcasting signals.

2. Description of the Related Art

A conventional television signal receiving tuner in the U.S. specification (hereinafter, it is simply referred to as a tuner) will be described with reference to FIGS. 4 and 5. FIG. 4 shows an input circuit unit for a conventional tuner, and FIG. 5 shows a selectivity characteristic for a part of the input circuit unit shown in FIG. 4. First, in FIG. 4, a VHF input circuit unit is constituted such that an induction-M high-pass filter 53 in a parallel type, a constant-K high-pass filter 54, an induction-M high-pass filter 55 in a serial type, a shunt trap 56, and a VHF input tuning circuit 57 are connected in series sequentially between an input terminal 51 and a VHF high-frequency amplifier 52. Also, a UHF input circuit unit 58 including a UHF input tuning circuit (not shown), etc. is connected to the input terminal 51.

The induction-M high-pass filter 53 in the parallel type is constituted of a first inductor 59 and a first capacitor 60 connected in parallel each other, and a shunt inductor 61, the respective one ends of the first inductor 59 and the first capacitor 60 are connected to the input terminal 51, and the other ends thereof are grounded through the shunt inductor 61. Further, a cut off frequency of this induction-M high-pass filter 53 in the parallel type is set to approximately 54 MHz, and the parallel resonance frequency by the first inductor 59 and the first capacitor 60 is set to approximately 41 MHz.

Moreover, the constant-K high-pass filter 54 is constituted of a shunt inductor 61 and a series capacitor 62 in which one end thereof is connected to the one end of this shunt inductor 61, and a cut off frequency thereof is also set to approximately 54 MHz. Accordingly, it leads to the shunt inductor 61 being commonly used by the induction-M high-pass filter 53 in the parallel type and the constant-K high-pass filter 54.

The induction-M high-pass filter 55 in the serial type is constituted of a series capacitor 62, a second inductor 63 and a second capacitor 64, which are connected in serial each other, which are connected between the other end of this series capacitor 62 and the ground, and a cut off frequency thereof is set to approximately 54 MHz, and also a serial resonance frequency of the second inductor 63 and the second capacitor 64 is set to approximately 26 MHz.

Furthermore, the shunt trap 56 is constituted of a third inductor 65 and a third capacitor 66 which are connected in parallel each other, and a parallel resonance frequency by the second inductor 65 and the second capacitor 66 is set to approximately 46 MHz.

Then, by the induction-M high-pass filter 53 in the parallel type, the constant-K high-pass filter 54, the induction-M high-pass filter 55 in the serial type, and the shunt trap 56, as shown in FIG. 5, passing through a frequency band equal to or more than approximately 54 MHz as well as attenuating sharply with a frequency equal to or less than 54 MHz, in particular, the attenuations in the middle frequency band of a television (approximately 41 MHz to 46 MHz in the U.S. specification), and in the citizen band (26 MHz) to be used in a transceiver are made larger as equal to or more than 55 dB. As a result, it is arranged that an interference signal of in the middle frequency band of the television and an interference signal in the citizen band are not to be inputted into the VHF input tuning circuit 57, and the VHF high-frequency amplifier 52, etc.

The VHF input tuning circuit 57 is constituted of four tuning inductors 67, 68, 69, 70 and a varactor diode 71, and is arranged such that a tuning frequency thereof can be varied by varying a capacitance value of the varactor diode 71. In this VHF input tuning circuit 57, the tuning inductors 67, 68, 69 and the varactor diode 71 are connected in a pai-shape, and one end of the tuning inductor 67 is grounded with a direct current blocking capacitor 72, and an anode of the varactor diode 71 is also grounded. A connecting point of the tuning inductor 67 and the tuning inductor 68 is connected to the shunt trap 56 through the direct current blocking capacitor 73 and the coupling inductor 74 being in series, and a connecting point of the tuning inductor 69 and a cathode of the varactor diode 71 is connected to the VHF high-frequency amplifier 52 through the coupling capacitor 75. Further, it is arranged such that the tuning inductor 70 is connected in parallel to the tuning inductor 67, through switch diodes 76, 77 respectively connected to the respective both ends thereof.

Further, the respective anodes of switch diodes 76, 77 are connected to a high-band switch terminal 79 through a resistor 78, and the respective cathodes thereof are connected to a low-band switch terminal 81 through a resistor 80, and moreover, the other terminal (cathode) of the varactor diode 71 is connected to a tuning voltage terminal 83 through a tuning inductor 69, a resistor 82.

Then, when receiving the television signals of the high-band, the switch diodes 76, 77 are set in the conducting state by applying a high-band switch voltage to the high-band switch terminal 79 (at this time a low-band switch voltage is not applied to the low-band switch terminal 81), and the tuning inductor 67 and the tuning inductor 70 are connected in parallel as high-frequency wise, thereby a tuning frequency of the VHF input tuning circuit 57 is made higher. Further, when receiving the television signals of the low-band, the switch diodes 76, 77 are set in the non-conducting state by applying a low-band switch voltage to the low-band switch terminal 81 (at this time a high-band switch voltage is not applied to the high-band switch terminal 79), and the tuning inductor 70 is being separated from the tuning inductor 67 as high-frequency wise, thereby a tuning frequency of the VHF input tuning circuit 57 is made lower. Then, a capacitance value of the varactor diode 71 is varied by a tuning voltage from the tuning voltage terminal 83, thereby it turns to be a tunable for the frequencies of the television signals of the respective channels in the low-band and the high-band which are allocated to the frequencies equal to or more than 54 MHz.

Further, although they are not shown, but a hybrid circuit, a local oscillator, etc. are connected to a post VHF high-frequency amplifier. Then, the television signals output from the VHF high-frequency amplifier 52 are frequency-converted to a middle frequency in the hybrid circuit.

Such a conventional tuner is incorporated into a car navigation system, for example, when utilizing as for use on a vehicle, but it was not enabling to receive the FM broadcasting. Therefore, it needs to incorporate an extra FM receiver or FM tuner and the like for receiving the FM broadcasting, and thus the car navigation system is turned to be complex, thereby a planning of the miniaturization and the lower price could not be made.

Furthermore, recently, a tuner is mounted on a personal computer, and it is considered that on a display thereof a picture (video) of a television is shown, or characters of a teletext are displayed, but in a conventional tuner the FM broadcasting could not be received, thereby the characters of the teletext in the FM broadcasting could not displayed.

SUMMARY OF THE INVENTION

Accordingly, it is an object of the present invention to provide a television signal receiving tuner which is capable of easily receiving the FM broadcasting signals, and also which is adapted to be not affected by other interference signals at a time when receiving the television signals or the FM broadcasting signals.

In order to solve the above problem, a television signal receiving tuner of the present invention comprises a first input terminal to which a television signal is input;

a second input terminal to which a FM broadcasting signal is input;

a VHF input tuning circuit;

a television signal input circuit provided between the first input terminal and the VHF input tuning circuit for passing through a television signal; and a FM broadcasting signal input circuit provided between the second input terminal and the VHF input tuning circuit for passing through a FM broadcasting signal, wherein, the FM broadcasting signal input circuit and the VHF input tuning circuit is to be separated in high frequency wise at a time of receiving the television signal, and wherein, the television signal input circuit and the VHF input tuning circuit is to be separated in high frequency wise at a time of receiving the FM broadcasting signal.

The television signal receiving tuner of the present invention comprises:

a first switch diode provided between the television signal input circuit and the VHF input tuning circuit; and a second switch diode provided between the FM broadcasting signal input circuit and the VHF input tuning circuit, wherein, the first switch diode is brought into conduction, and the television signal having passed through the television signal input circuit is input into the VHF input tuning circuit through the first switch diode, as well as the FM broadcasting signal input circuit and the television signal input circuit are separated in high frequency wise at a time of receiving the television signal, wherein, the second switch diode is brought into conduction, and the FM broadcasting signal having passed through the FM broadcasting signal input circuit is input into the VHF input tuning circuit through the second switch diode, as well as the first switch diode is brought out of conduction, and the television signal input circuit and the VHF input tuning circuit are separated in high frequency wise at a time of receiving the FM broadcasting signal.

The television signal receiving tuner of the present invention is arranged that the television signal input circuit comprises at least a first intermediate frequency trap for attenuating an intermediate frequency band of the television, in which a first inductor and a first capacitor are connected in parallel each other, and the FM broadcasting signal input circuit comprises at least a highpass filter for attenuating a frequency less than a FM broadcasting frequency band.

The television signal receiving tuner of the present invention is arranged that a cathode of the first switch diode and a cathode of the second switch diode are connected to the ground in direct current wise through a common resistor, a television switch voltage for switching to a receiving state of a television signal is applied to an anode of the first switch diode when receiving the television signal, and a FM switch voltage for switching to a receiving state of a FM broadcasting signal is applied to an anode of the second switch diode when receiving the FM broadcasting signal.

The television signal receiving tuner of the present invention is arranged that the FM broadcasting signal input circuit further comprises a serial trap connected between a signal path and the ground, in which a second inductor and a second capacitor are connected in series each other, and wherein a trap frequency of the serial trap is set to a frequency band in the low-band of a television broadcasting.

The television signal receiving tuner of the present invention comprises a second intermediate frequency trap for attenuating an intermediate frequency band of the television, in which a third inductor and a third capacitor are connected in parallel each other, between a connection point of the cathode of first switch diode and the cathode of second switch diode and the VHF input tuning circuit.

DESCRIPTION OF THE PREFERRED EMBODIMENT

Figure 1:
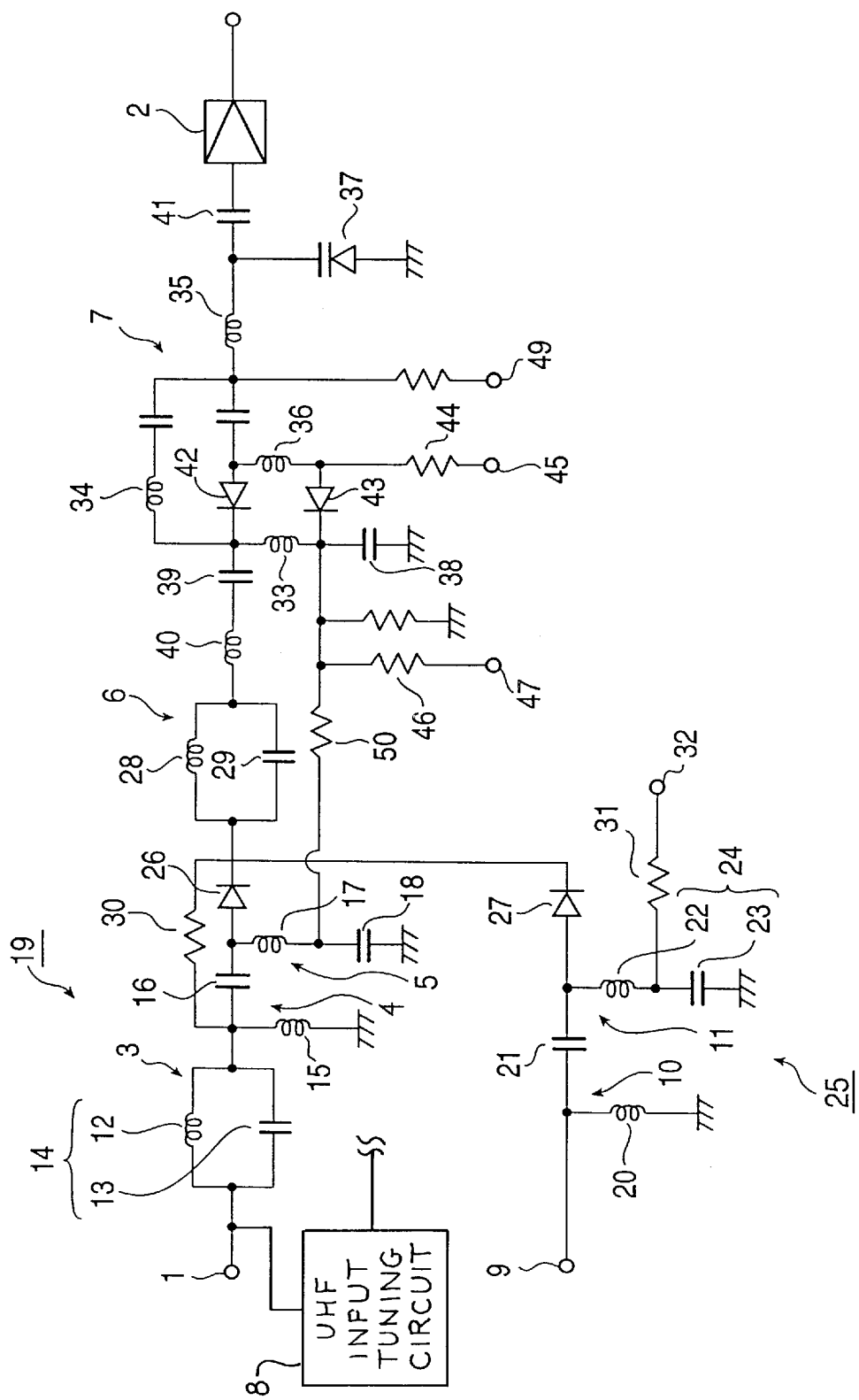
FIG. 1 is a circuit diagram showing a television signal receiving tuner of the present invention.
Figure 2:
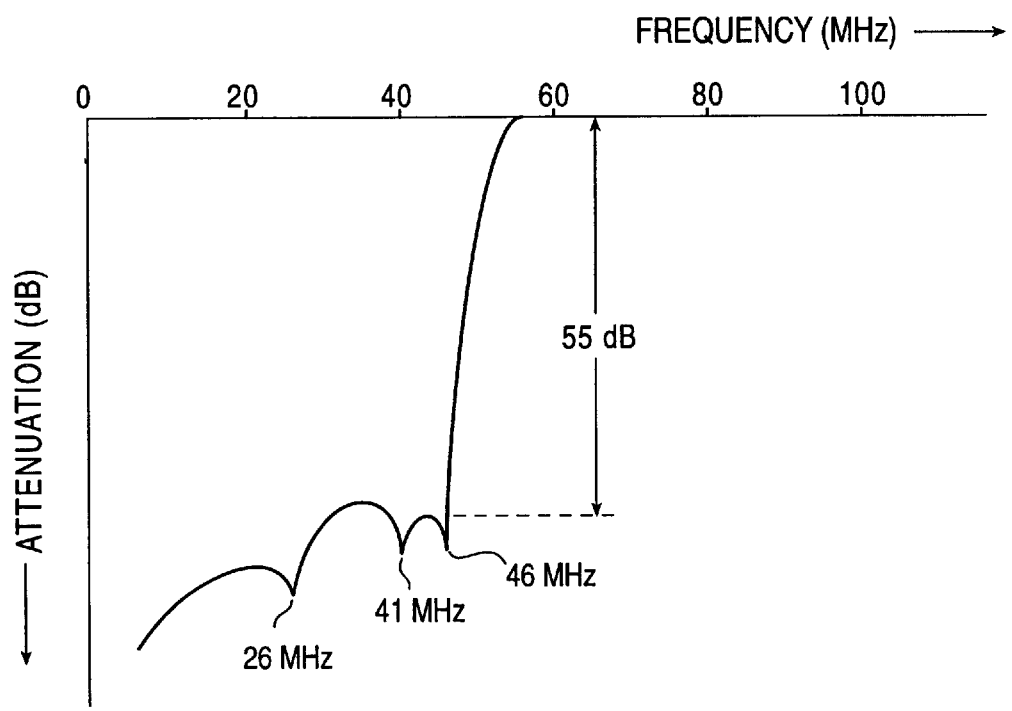
FIG. 2 is a diagram showing a selectivity characteristic of an input circuit unit in the television signal receiving tuner of the present invention.
Figure 3:
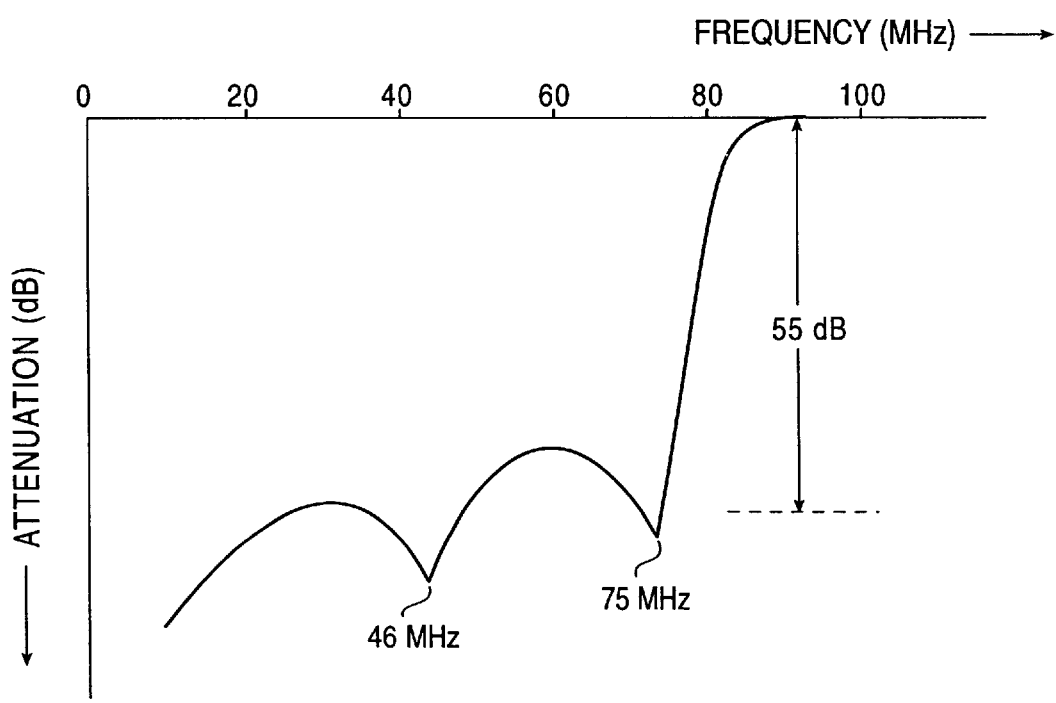
FIG. 3 is a diagram showing a selectivity characteristic of an input circuit unit in the television signal receiving tuner of the present invention.
Figure 4:
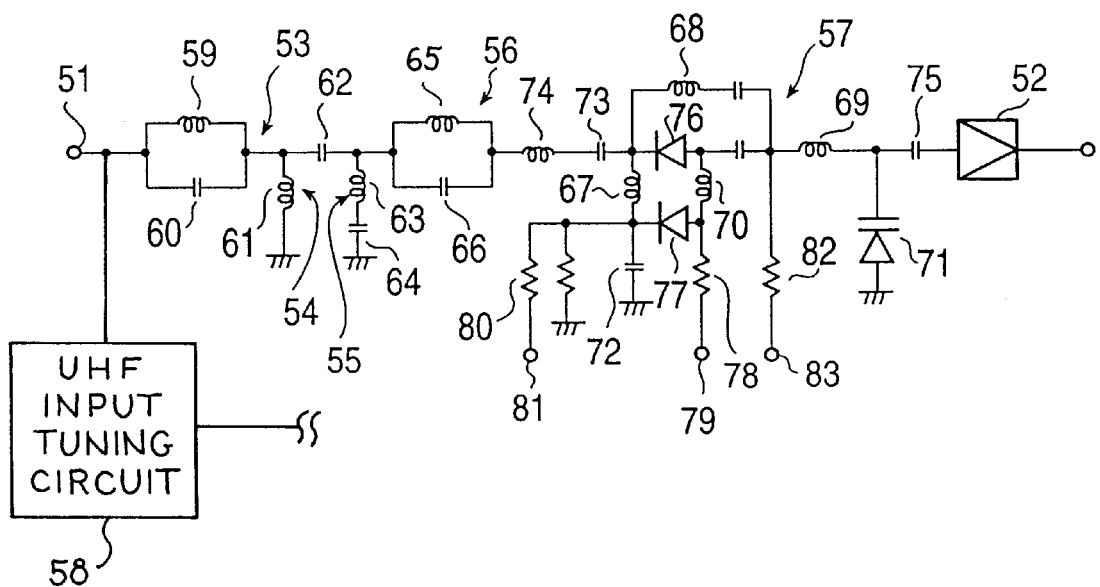
FIG. 4 is a circuit diagram showing a conventional television signals receiving tuner.
Figure 5:
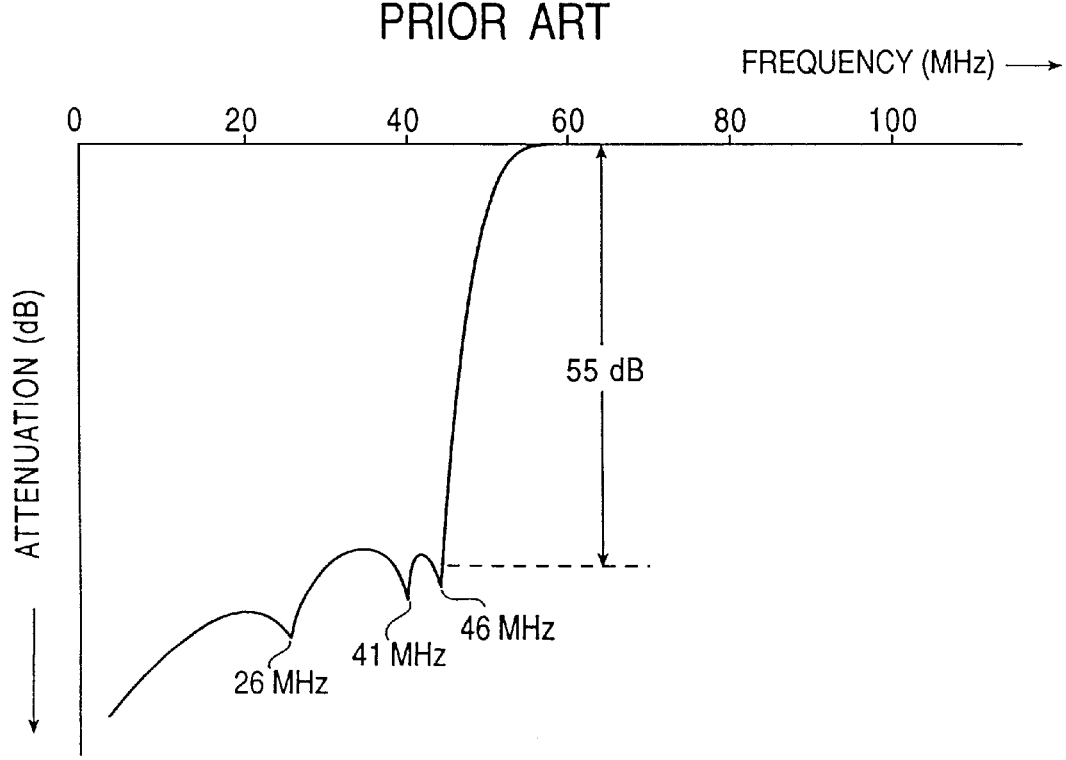
FIG. 5 is a diagram showing a selectivity characteristic of an input circuit unit in a conventional television signal receiving tuner.

The television signal receiving tuner of the present invention will be described with reference to FIGS. 1 to 3. FIG. 1 shows an input circuit unit of the television signal receiving tuner of the present invention, FIG. 2 shows a selectivity characteristic at a time of receiving the television signals in a part of the input circuit unit shown in FIG. 1, FIG. 3 shows a selectivity characteristic at a time of receiving the FM broadcasting signals in a part of the input circuit unit shown in FIG. 1. An induction M highpass filter 3 in a parallel type, a first constant K highpass filter 4, A first induction M highpass filter 5 in serial type, a shunt trap 6, a VHF input tuning circuit 7 are connected in series sequentially between a first input terminal 1 to which the television signals or the CATV signals are input and the VHF high frequency amplifier 2. A UHF input circuit 8 including a UHF input tuning circuit which is not shown and the like is connected to the first input terminal 1.

On the other hand, a second constant K highpass filter 10 and a second induction M highpass filter 11 are connected in series between the second input terminal 9 to which the FM broadcasting signals are input and the shunt trap 6.

The induction M highpass filter 3 in the parallel type is constituted of a first intermediate frequency trap 14 composed of a first inductor 12 and a first capacitor 13, and a first shunt inductor 15, and one end of the first intermediate frequency trap 14 (the respective one ends of the first inductor 12 and the first capacitor 13) is connected to the first input terminal 1, the other end thereof is grounded through the first shunt inductor 15. Then, a cut-off frequency of this induction M highpass filter 3 in the parallel type is set to approximately 54 MHz, and a trap frequency of the first intermediate frequency trap 14 (a parallel resonance frequency bo the first inductor 12 and the first capacitor 13) is set to approximately 41 MHz that is an intermediate frequency band of a television in the U. S. specification.

Further, the first constant K highpass filter 4 is constituted of the first shunt inductor 15 and the first series capacitor 16 whose one end is connected to one end of this first shunt inductor 15, and a cut-off frequency thereof is also set to an approximately 54 MHz. Accordingly, the first shunt inductor 15 is commonly used by the inductor M high-pass filter 3 in the parallel type and the first constant-K highpass 4.

The inductor M highpass filter 5 in the serial type constituted of the first series capactor 16, as well as the inductor 17 and the capacitor 18 which are connected in series between the other end of the first series capacitor 16 and the ground. A cutoff frequency of this induction M highpass filter 5 in the series is also set to an approximately 54 MHz, and a serial resonance frequency of the inductor 17 and the capactor 18 which are connected in series is set to 26 MHz of the citizen band which is used in a transceiver. Accordingly, the first series capacitor 16 is commonly used by the first constant K highpass filter 4 and the induction highpass filter 5 in the series.

Then, the television signal input circuit 19 is constituted of the inductor M highpass filter 3 in the parallel type, the first constant K highpass filter 4, and the inductor M highpass filter 5 in the series type.

On the other hand, the second constant K highpass filter 10 is constituted of a second shunt inductor 20 and a second series capactor 21, and a connection point of the second. shunt inductor 20 and the second series capacitor 21 is connected to the second input terminal 9. Then, a cutoff frequency of this second constant K highpass filter 10 is set to approximately 85 MHz. Furthermore, the second inductor M highpass filter 11 in the series type is constituted of a series trap 24 which is composed of a second inductor 22 and a second capacitor 23 connected in series each other, and a second series capacitor 21, a cutoff frequency thereof is also set to approximately 85 MHz, and a trap frequency (a serial resonance frequency by the second inductor 22 and the second capacitor 23) of the series trap 24 is set to approximately 75 MHz which is a frequency of a low-band of a television in the U.S. specification. The FM broadcasting input circuit 25 is constituted of the second constant K highpass filter 10 and the second inductor M highpass filter 11 in the series type.

Then, a connection point of the first series capacitor 16 and the inductor 17 which is an output terminal of the television signals input circuit 19, and a connection point of the second series capacitor 21 and the second inductor 22 which is an output terminal of the FM broadcasting signals input circuit 25 are respectively connected to the shunt trap 6 through a first switch diode 26 and a second switch diode 27. Herein, the shunt trap circuit 6 is constituted of a parallel resonance circuit of a third inductor 28 and a third capacitor 29, and a parallel resonance frequency thereof is set to approximately 46 MHz which is an intermediate frequency band of a television in the U.S. specification. Accordingly, this shunt trap turns to be a second intermediate frequency trap. Furthermore, a cathode of the first switch diode 26 and a cathode of the second switch diode 27 are connected to each other, and also connected to the shunt trap 6 (the second intermediate frequency trap), and a connection point thereof is connected to a connection point of the first shunt inductor 15 and the first series capacitor 16 which constitute the first constant K highpass filter through the resistor 30. Further, an anode of the second switch diode 27 is connected to a FM switch terminal 32 through the second inductor 22, and the resistor 31.

The VHF input tuning circuit 7 is constituted of four tuning inductors 33, 34, 35, 36 and a varactor diode 37, and is arranged that a tuning frequency thereof can be varied by varying a capacitance value of the varactor diode 37. In this VHF input tuning circuit 7, the tuning inductors 33, 34, 35, and the varactor diode 37 are connected in the pai-type, and one end of the tuning inductor 33 is grounded with a D.C. blocking capacitor 38, and also an anode of the varactor diode 37 is grounded. A connection point of the tuning inductor 33 and the tuning inductor 34 is connected to the shunt trap 6 through the D.C. blocking capacitor 39 and a coupling inductor 40 in series, and the tuning inductor 35 and a cathode of the varactor diode 37 are connected to the VHF high-frequency amplifier 2 through a coupling capacitor 41. Furthermore, the tuning inductor 36 is arranged to be connected in parallel to the tuning inductor 33 through the third switch diode 42, the fourth switch diode 43 which are respectively connected to the respective both ends thereof.

For the third switch diode 42 and the fourth switch diode 43, the anodes thereof are connected to the tuning inductor 33, and the cathodes thereof are connected to the tuning inductor 36, respectively, and the respective anodes of the third switch diode 42 and the fourth switch diode 43 are connected to the high-band switch terminal 45 through the resistor 44, and the respective cathodes thereof are connected to the low-band switch terminal 47 through the resistor 46 as well. Then, the cathodes of the third switch diode 42 and the fourth switch diode 43 are connected to the anode of the first switch diode 26 through in serial the resistor 50 and the inductor 17 which constitutes the first inductor M highpass filter 5 in the series type.

In this television signal receiving tuner, when receiving a television signal of the high-band or low-band, without applying a FM switch voltage to the FM switch terminal 32, the high-band switch voltage is applied to the high-band switch terminal 45 or the low-band switch voltage is applied to the low-band switch terminal 47. Thus, a current flows through the first switch diode 26, the resistor 30 and the first shunt inductor 15 which constitutes the first constant K highpass filter 4 via the resistor 50 and the inductor 17, thereby the first switch diode 26 is brought into conduction. At this moment, because a reverse bias voltage is applied to (the anode of) the second switch diode by the resistor 30, the second switch diode 27 is brought out of conduction. Accordingly, there exists the FM broadcasting signal input circuit 25 being isolated from the VHF input tuning circuit 7 in a high frequency wise.

As a result, a television signal being input to the first input terminal is introduced into the VHF input tuning circuit 7 through the induction M highpass filter 3 in the parallel type, the first constant K highpass filter 4, the first inductor M highpass filter 5 in the serial type, the first switch diode 26, and the shunt trap 6. Then, the selectivity characteristic from the first input terminal 1 to the shunt trap circuit 6 is, as shown in FIG. 2, passing through a frequency band of an approximately 54 MHz or more, and is attenuated sharply at a frequency equal to or lessthan 54 MHz, in particular making the attenuations in the intermediate frequency band of the television (approximately 41 MHz to 46 MHz in the U.S. specification) and in the citizen band (26 MHz) being used for the transceiver to be larger, thereby obtaining the attenuation equal to or more than 55 dB in the intermediate frequency band as well as obtaining the attenuation of more than the above mentioned attenuation in the 26 MHz.

On the other hand, the FM broadcasting signal being input to the second input terminal 9 is arranged to be not introduced to the VHF input tuning circuit 7 because the second switch diode 27 is brought out of conduction.

Then, among the television signals, when receiving a television signal of the high-band, both of the third switch diode 42 and the fourth switch diode 43 are brought into conduction by applying a high-band switch voltage to the high-band switch terminal 45 (at this time the low-band switch voltage is not applied to the low-band switch terminal 47), thus the tuning inductor 33 and the tuning inductor 36 are connected in parallel in high frequency wise, thereby a tuning frequency of the VHF input tuning circuit 7 is to be made higher.

Furthermore, when receiving a television signal of the low band, both of the third switch diode 42 and the fourth switch diode 43 are brought out of conduction by applying a low-band switch voltage to the low-band switch terminal 47 (at this time the high-band switch voltage is not applied to the high-band switch terminal 45), thus the tuning inductor 36 is isolated from the tuning inductor 33 in high frequency wise, thereby a tuning frequency of the VHF input tuning circuit 7 is to be made lower.

Furthermore, when receiving a television signal of a high-band or a television signal of a low-band, a capacitance value of the varactor diode 37 would be changed by a tuning voltage from the tuning voltage terminal 49, and could be tuned with a television signal of each channel for a low-band or a high-band, which is assigned to a frequency of 54 MHz or more.

On the other hand, when receiving the FM broadcasting, a low-band switch voltage and a FM switch voltage are respectively applied to the low-band switch terminal 47 and the FM switch terminal 32, without applying a high-band switch voltage to the high-band switch terminal 45. As a result, a reverse bias voltage is applied to the third switch diode 42 and the fourth switch diode 43, respectively, thereby these switch diodes 42, 43 are brought out of conduction, and the VHF input tuning circuit 7 is brought into the same state as to receive the low-band television signal. Further, by the FM switch voltage applied to the FM switch terminal 32, a current flows through the resistor 31, the second inductor 22, the second switch diode 27, the resistor 30, and the first shunt inductor 15, thereby the second switch diode 27 is brought into conduction. At this moment, because a reverse bias voltage is applied to (the cathode) of the first switch diode 26, by the resistor 30, the first switch diode 26 is brought out of conduction. Accordingly, the television signal input circuit 19 is separated from the VHF input tuning circuit 7 in high frequency wise, and an introduction of the television signal being input into the first input terminal to the VHF input tuning circuit 7 is blocked by the first switch diode 26. On the other hand, the FM broadcasting signal being input into the second input terminal 9 is input into the VHF input tuning circuit 7 through the second constant K highpass filter 10, the second induction M highpass filter 11 in the serial type, the second switch diode 27, and the shunt trap 6.

As a result, the overall selectivity characteristics according to the second constant K highpass filter 10, the second induction M highpass filter 11 in the serial type, the second switch diode 27, and the shunt trap are, as shown in FIG. 3, to be passed through at frequencies equal to or more than 85 MHz, to be attenuated at frequencies equal to or less than 85 MHz, and more particularly, to be attenuated with 55 dB or more at the vicinity of 75 MHz by the serial trap 24, as well as to be attenuated with more value than indicated above at the vicinity of 46 MHz by the shunt trap 6. Accordingly, an entering of an interference signal of a television's intermediate frequency band into the VHF input tuning circuit 7 is blocked by the shunt trap 6. Further, even if the television signal being input to the first input terminal 1 attempted to enter into the VHF input tuning circuit 7 by leaking out the first switch diode 26, it is arranged to be not affected by an interference from the television signal because the television signal of the low-band near the FM broadcasting frequency band is to be attenuated by the serial trap 24 disposed in the FM broadcasting signal input circuit 25.

Then, the FM broadcasting signal having been input from the VHF input tuning circuit 7 is selected in the VHF input tuning circuit by a tuning voltage from the tuning voltage terminal 49 in similar to the one at a time of receiving the television signal of the low-band.

Further, although not shown, a first hybrid circuit, a first local oscillator, etc. are connected to a post-VHF high frequency amplifier. Then, a video signal of the television can be obtained in such a manner that a television signal output from the VHF high-frequency amplifier 2 is frequency-converted to the intermediate frequency of 40 MHz band in the first hybrid circuit. Moreover, it would be possible to implement a FM detection used for the FM receiver, by converting this intermediate frequency to the FM's intermediate frequency of 10.7 MHz used for the conventional FM receiver, as providing a second hybrid circuit (not shown) to the post-first hybrid circuit, thereby enabling to listen the FM broadcasting easily by a well-known technique.

As described above, the television signal receiving tuner of the present invention comprises:
  a first input terminal to which a television signal is input;
  a second input terminal to which a FM broadcasting signal is input;
  a VHF input tuning circuit;
  a television signal input circuit provided between the first input terminal and the VHF input tuning circuit for passing through a television signal; and
  a FM broadcasting signal input circuit provided between the second input terminal and the VHF input tuning circuit for passing through a FM broadcasting signal,
  wherein, the FM broadcasting signal input circuit and the VHF input tuning circuit is to be separated in high frequency wise at a time of receiving the television signal, and
  wherein, the television signal input circuit and the VHF input tuning circuit is to be separated in high frequency wise at a time of receiving the FM broadcasting signal, thereby a tuner enabling to receive a television signal and a FM broadcasting signal without interfering each other. Accordingly, a television signal receiving tuner suitable for a use on a vehicle and/or for a use in a personal computer can be obtained.

Further, the television signal receiving tuner of the present invention comprises:

a first switch diode provided between the television signal input circuit and the VHF input tuning circuit; and a second switch diode provided between the FM broadcasting signal input circuit and the VHF input tuning circuit, wherein, the first switch diode is brought into conduction, and the television signal having passed through the television signal input circuit is input into the VHF input tuning circuit through the first switch diode, as well as the FM broadcasting signal input circuit and the television signal input circuit are separated in high frequency wise at a time of receiving the television signal, wherein, the second switch diode is brought into conduction, and the FM broadcasting signal having passed through the FM broadcasting signal input circuit is input into the VHF input tuning circuit through the second switch diode, as well as the first switch diode is brought out of conduction, and the television signal input circuit and the VHF input tuning circuit are separated in high frequency wise at a time of receiving the FM broadcasting signal, thereby either one of a television signal and a FM broadcasting signal is input into the VHF input tuning circuit, and the other one can be easily separated.

Further, the television signal receiving tuner of the present invention is arranged such that the television signal input circuit comprises at least a first intermediate frequency trap for attenuating an intermediate frequency band of the television, in which a first inductor and a first capacitor are connected in parallel each other, and the FM broadcasting signal input circuit comprises at least a highpass filter for attenuating a frequency less than a FM broadcasting frequency band, thereby the interference signal in the intermediate frequency band at a time of receiving the television signal can be removed, and also the television signal of the low-band of a frequency which is near the frequency of the FM broadcasting signal at a time of receiving the FM broadcasting signal can be removed.

Moreover, the television signal receiving tuner of the present invention is arranged such that a cathode of the first switch diode and a cathode of the second switch diode are connected to the ground in direct current wise through a common resistor, a television switch voltage for switching to a receiving state of a television signal is applied to an anode of the first switch diode when receiving the television signal, and a FM switch voltage for switching to a receiving state of a FM broadcasting signal is applied to an anode of the second switch diode when receiving the FM broadcasting signal, thereby the television signal input circuit can be substantially separated from the VHF input tuning circuit in high frequency wise.

Further, the television signal receiving tuner of the present invention is arranged such that the FM broadcasting signal input circuit further comprises a serial trap connected between a signal path and the ground, in which a second inductor and a second capacitor are connected in series each other, and wherein a trap frequency of the serial trap is set to a frequency band in the low-band of a television broadcasting, thereby the television signal of the low-band of a frequency which is near the frequency of the FM broadcasting signal at a time of receiving the FM broadcasting signal can be attenuated with a great degree, and no interference from the television signal of the low-band is affected.

Also, the television signal receiving tuner of the present invention further comprises a second intermediate frequency trap for attenuating an intermediate frequency band of the television, in which a third inductor and a third capacitor are connected in parallel each other, between a connection point of the cathode of first switch diode and the cathode of second switch diode and the VHF input tuning circuit, thereby the first and second intermediate frequency traps (i.e., two traps) are provided between the first terminal and the VHF input tuning circuit at a time of receiving the television signal, thereby the attenuation of the intermediate frequency band can be made larger, and also the intermediate frequency band of the television can be attenuated at a time of receiving the FM broadcasting signal.

What is claimed is:

1. A television signal receiving tuner, comprising:

a first input terminal to which a television signal is input;

a second input terminal to which a FM broadcasting signal is input;

a VHF input tuning circuit;

a television signal input circuit provided between said first input terminal and said VHF input tuning circuit for passing through the television signal; and a FM broadcasting signal input circuit provided between said second input terminal and said VHF input tuning circuit for passing through the FM broadcasting signal;

wherein, said FM broadcasting signal input circuit and said VHF input tuning circuit is to be cut off in radio frequency wise at a time of receiving the television signal, and wherein, said television signal input circuit and said VHF input tuning circuit is to be cut off in radio frequency wise at a time of receiving the FM broadcasting signal.

2. A television signal receiving tuner according to claim 1, comprising:

a first switch diode provided between said television signal input circuit and said VHF input tuning circuit; and a second switch diode provided between said FM broadcasting signal input circuit and said VHF input tuning circuit, wherein, said first switch diode is brought into conduction, and the television signal having passed through said television signal input circuit is input into said VHF input tuning circuit through said first switch diode, as well as said second switch diode is brought out of conduction, and the FM broadcasting signal input circuit and said television signal input circuit are cut off in radio frequency wise at a time of receiving the television signal, wherein said second switch diode is brought into conduction, and the FM broadcasting signal having passed through said FM broadcasting signal input circuit is input into said VHF input tuning circuit through said second switch diode, as well as said first switch diode is brought out of conduction, and the television signal input circuit and said VHF input tuning circuit are cut off in radio frequency wise at a time of receiving the FM broadcasting signal.

3. A television signal receiving tuner according to claim 2, wherein, a cathode of said first switch diode and a cathode of said second switch diode are connected to the ground in direct current wise through a common resistor, a television switch voltage for switching to a receiving state of the television signal is applied to an anode of said first switch diode when receiving the television signal, and a FM switch voltage for switching to a receiving state of the FM broadcasting signal is applied to an anode of said second switch diode when receiving the FM broadcasting signal.

4. A television signal receiving tuner according to claim 3, further comprises an intermediate frequency trap for attenuating an intermediate frequency band of the television signal, in which an inductor and a capacitor are connected in parallel with each other, between a connection point of said cathode of said first switch diode and said cathode of said second switch diode and said VHF input tuning circuit.

5. A television signal receiving tuner according to claim 1, wherein, said television signal input circuit comprises at least a first intermediate frequency trap for attenuating an intermediate frequency band of the television signal, in which a first inductor and a first capacitor are connected in parallel with each other, and said FM broadcasting signal input circuit comprises at least a highpass filter for attenuating a frequency less than a FM broadcasting frequency band.

6. A television signal receiving tuner according to claim 5, wherein, said FM broadcasting signal input circuit further comprises a serial trap connected between a signal path and the ground, in which a second inductor and a second capacitor are connected in series with each other, and wherein a trap frequency of said serial trap is set to a frequency in the low-band of a television broadcasting.

* * * * *